United States Patent [19]

Cory et al.

[11] Patent Number: 4,533,114
[45] Date of Patent: Aug. 6, 1985

[54] FAIL-SAFE ACTUATOR FOR ROTARY VALVES

[75] Inventors: John M. Cory, Old Lyme; Edward W. Varney, Centerbrook, both of Conn.; Jon A. Babcock, Westerly, R.I.; Andrew Pupillo, Pawcatuck, Conn.

[73] Assignee: Posi-Seal International, Inc., North Stonington, Conn.

[21] Appl. No.: 465,028

[22] Filed: Feb. 8, 1983

[51] Int. Cl.³ .............................. F16K 31/44
[52] U.S. Cl. .................... 251/67; 251/74; 251/249.5; 137/75; 74/406
[58] Field of Search ............... 251/67, 73, 74, 249.5, 251/49, 58; 137/75-77; 74/405, 406, 625

[56] References Cited

U.S. PATENT DOCUMENTS

| Re. 30,135 | 11/1979 | Fitzwater | 74/625 |
|---|---|---|---|
| 112,450 | 3/1871 | Haas | 251/249.5 |
| 379,194 | 3/1888 | Barnes | 74/625 |
| 711,113 | 10/1902 | Kraeger | 251/74 |
| 900,260 | 10/1908 | Boyd | 251/67 |
| 902,096 | 10/1908 | Love | 251/74 |
| 966,672 | 8/1910 | Ellison | 251/67 |
| 1,226,559 | 5/1917 | Mason | 74/405 |
| 1,497,946 | 6/1924 | Schmidt | 137/77 |
| 1,774,395 | 8/1930 | Murray | 137/77 |
| 1,831,021 | 11/1931 | Markel | 251/73 |
| 1,947,637 | 2/1934 | Bolster | 251/249.5 |
| 3,085,781 | 4/1963 | Pointe | 251/67 |
| 3,164,359 | 1/1965 | Dyer et al. | 251/73 |
| 3,234,818 | 2/1966 | Cantalupo et al. | 74/625 |
| 3,378,021 | 4/1968 | Milo | 137/75 |
| 3,538,929 | 11/1970 | Botkin | 251/67 |
| 3,785,615 | 1/1974 | Haven | 251/74 |
| 3,889,924 | 6/1975 | Karpenko | 251/249.5 |
| 4,261,546 | 4/1981 | Cory et al. | 251/58 |

FOREIGN PATENT DOCUMENTS

| 843735 | 6/1970 | Canada | 251/73 |
|---|---|---|---|
| 1275143 | 9/1961 | France | 251/74 |
| 853055 | 11/1960 | United Kingdom | 74/405 |

OTHER PUBLICATIONS

Posi-Seal International, Inc. "Posi-Seal High Performance Trunnion Valves", p. 4, ©1980.
Posi-Seal International, Inc., "Don't Get Burned With an Unsafe, Fire Safe Valve", p. 4, ©1980.

Primary Examiner—Samuel Scott
Assistant Examiner—Noah Kamen
Attorney, Agent, or Firm—Morgan, Finnegan, Pine, Foley & Lee

[57] ABSTRACT

An actuator for a rotary valve includes a fail-safe mechanism for automatically opening or closing the valve upon the occurrence of a predetermined condition. The actuator also includes a mechanism for permitting the manual operation of the valve from the open to closed position, and vice versa, and to a continuum of positions between the open and closed positions even when the fail-safe mechanism is activated. A biased clutch activates the fail-safe mechanism and also couples a worm-gear drive for effecting the manual operation of the valve.

26 Claims, 7 Drawing Figures

FAIL-SAFE ACTUATOR FOR ROTARY VALVES

BACKGROUND OF THE INVENTION

1. Field of the Invention

This invention relates to valve actuators, and particularly to a valve actuator for automatically closing or opening, upon the sensing of a predetermined condition, a valve having a rotatable closure member such as a butterfly, plug or ball valve.

2. Description of the Prior Art

Many industrial applications for rotary valves such as butterfly, plug and ball valves require a fail-safe mechanism that will automatically close or open a valve upon the occurrence of a predetermined condition. For example, in the petroleum industry it is often desirable to have valves that will automatically close and prevent the flow of petroleum upon the occurrence of a fire. Such valves are generally referred to as fail-close valves. Similarly, it may be desirable, upon the occurrence of a fire, to effect the automatic opening of a valve that controls the flow of water in a sprinkler system. Such a valve is generally known as a fail-open valve. A shortcoming associated with known rotary valve actuators having a fail-safe feature is that they typically provide the valve with only two states, i.e., either open or closed. Many times, however, it is desirable to operate a valve manually to an intermediate state so that the flow of the fluid through the valve may be controlled.

Another shortcoming associated with many known fail-safe actuators for rotary valves is that they can operate only in the fail-open mode or only in the fail close mode, but not both.

It is an object of this invention to provide a fail-safe actuator for a rotary valve that can automatically open or close the valve upon the sensing of a predetermined condition.

It is another object of this invention to provide a fail-safe actuator having the above characteristics that can effect the manual operation of the valve to any position intermediate the open and closed position in addition to the open and closed position.

It is a further object of this invention to provide a fail-safe actuator having the above characteristics that is a fully enclosed, self-energized actuating device and that is compact in construction and easy to operate.

SUMMARY OF THE INVENTION

In accordance with the above objectives, the present invention provides an actuator for a rotary valve having a valve stem rotatable between a valve close and a valve open position. The actuator includes a housing mountable on the valve adjacent to the valve stem and an output shaft member rotatable within the housing for coupling to the valve stem such that rotation of the shaft effects rotation of the valve stem and the opening or closing of the valve.

First biasing means is coupled to the output shaft for biasing the shaft in a first position. In the preferred embodiment of the invention this biasing means comprises a spiral torsion spring disposed around the output shaft, the spring having an inner end portion that engages a first biasing engagement means associated with the shaft, and an outer end portion. In addition, it is preferable that the actuator include a stop member and a stop engagement member associated with the output shaft for engaging the stop member when the output shaft is in its first position. It is further preferable that the spring have a predetermined pre-loaded stored energy level when the output shaft is in its first position so as to force the stop engagement member against the stop when the shaft is in its first position.

The actuator further includes means for rotating the output shaft from its first position to a second position against the bias provided by the torsion spring. The rotating means is adapted to fix the shaft in such second position and a continuum of intermediate positions between its first and second positions. Preferably, the rotating means comprises a gear fixedly connected to the output shaft and a worm disposed adjacent to the gear, the worm being fixedly connected to a gear shaft rotatably mounted in the housing.

Clutch means associated with the gear shaft selectively engages the worm with the gear. Preferably, the clutch means comprises a crankshaft rotatably mounted in the housing, the gear shaft being rotatably disposed within the crankshaft. It is also preferable that the crankshaft comprise a pair of spaced apart body portions and means for connecting the body portions, the worm being disposed in the space between the crankshaft body portions. The gear shaft and crankshaft are eccentric with one another such that when the crankshaft is in a first position the worm is disengaged from the gear, and when the crankshaft is rotated to a second position the worm is brought into engagement with the gear.

The subject actuator further comprises second biasing engagement means that is mounted in the housing for engaging the outer end portion of the torsion spring, and linkage means that is coupled to the second biasing engagement means and the crankshaft such that when the crankshaft is rotated towards its second position the second biasing engagement means acts on the outer end portion of the spring so as to tighten the spring.

Preferably, the second biasing engagement means comprises a first lever pivotally connected to the housing, the lever including a pair of spaced apart flange members each of which having an aperture. The flange apertures are aligned for receiving a pin member therethrough which engages the outer end portion of the spring. When the lever is in a first position, the spring has a first stored energy level and when the lever is pivoted to a second position the spring has a second stored energy level that is greater than the first stored energy level.

The linkage means preferably comprises a second lever fixedly coupled to the first lever, and a linkage arm pivotally connected at one end to the second lever and at the other end to the crankshaft such that when the crankshaft is in its first position the first lever is in its first position, and when the crankshaft is in its second position the first lever is in its second position.

The actuator further includes clutch fixing means for selectively fixing the crankshaft in its second position against the bias of the spring. In accordance with the invention, the clutch fixing means comprises an activator arm, one end of which is fixedly connected to the crankshaft. The other end of the activator arm is adapted to cooperate with receiver means associated with the housing and connector means for connecting the activator arm to the receiver means and temporarily restraining the crankshaft from moving from its second position.

The actuator further includes release means for acting on the activator arm, receiver means and connector means so as to permit the spring to return the crankshaft to its first position thus disengaging the worm from the gear and permitting the spring to rotate the output shaft to its first position.

The release means can comprise manual means for disconnecting the activator arm from the receiver means. It may also comprise temperature activated means or other automatic means, such as electrically, pneumatically or hydraulically activated means that operates upon the occurrence of a predetermined condition.

DETAILED DESCRIPTION OF THE PREFERRED EMBODIMENTS

Figure 1:
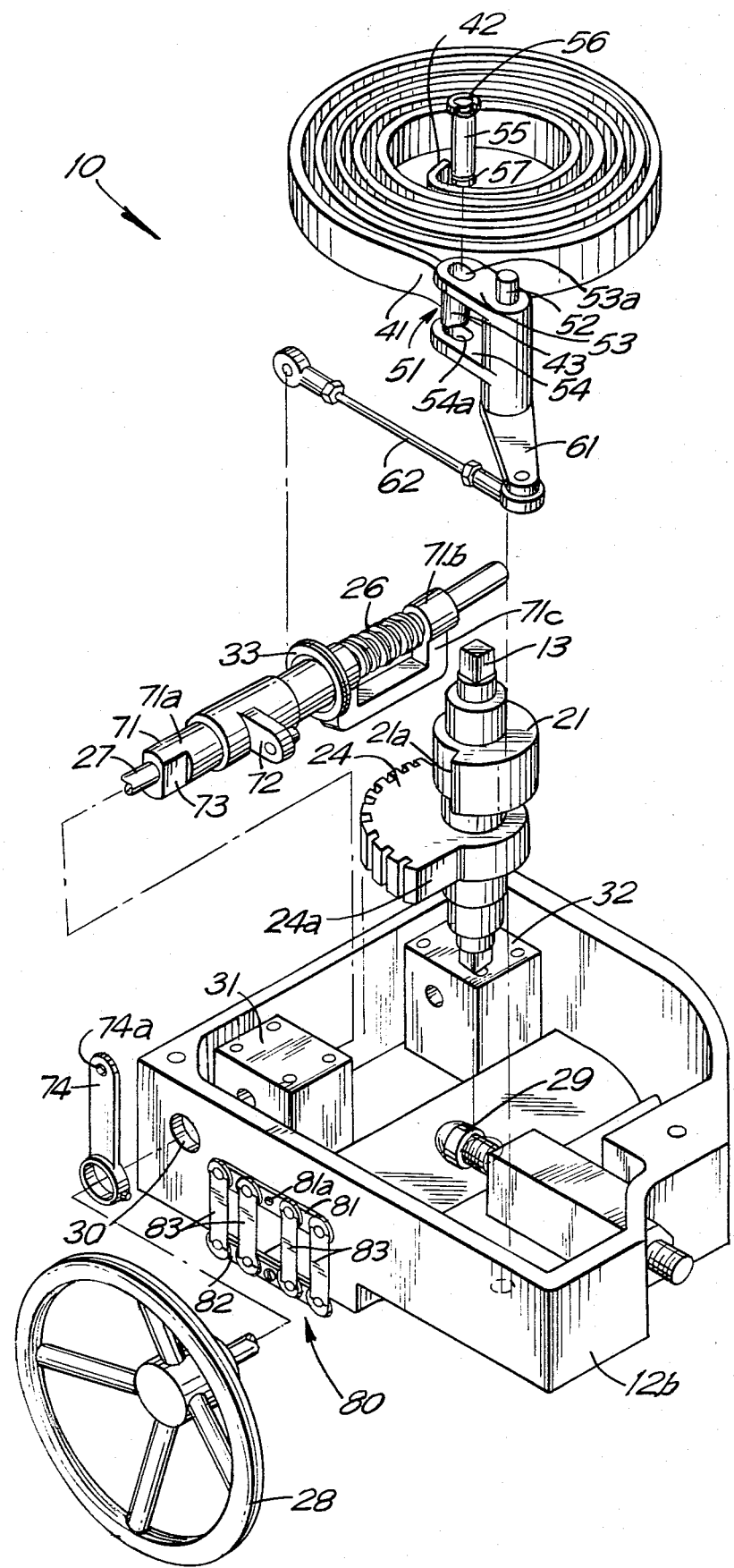
FIG. 1 is an exploded perspective view of the actuator of the invention with the top portion of the actuator housing removed.
Figure 2:
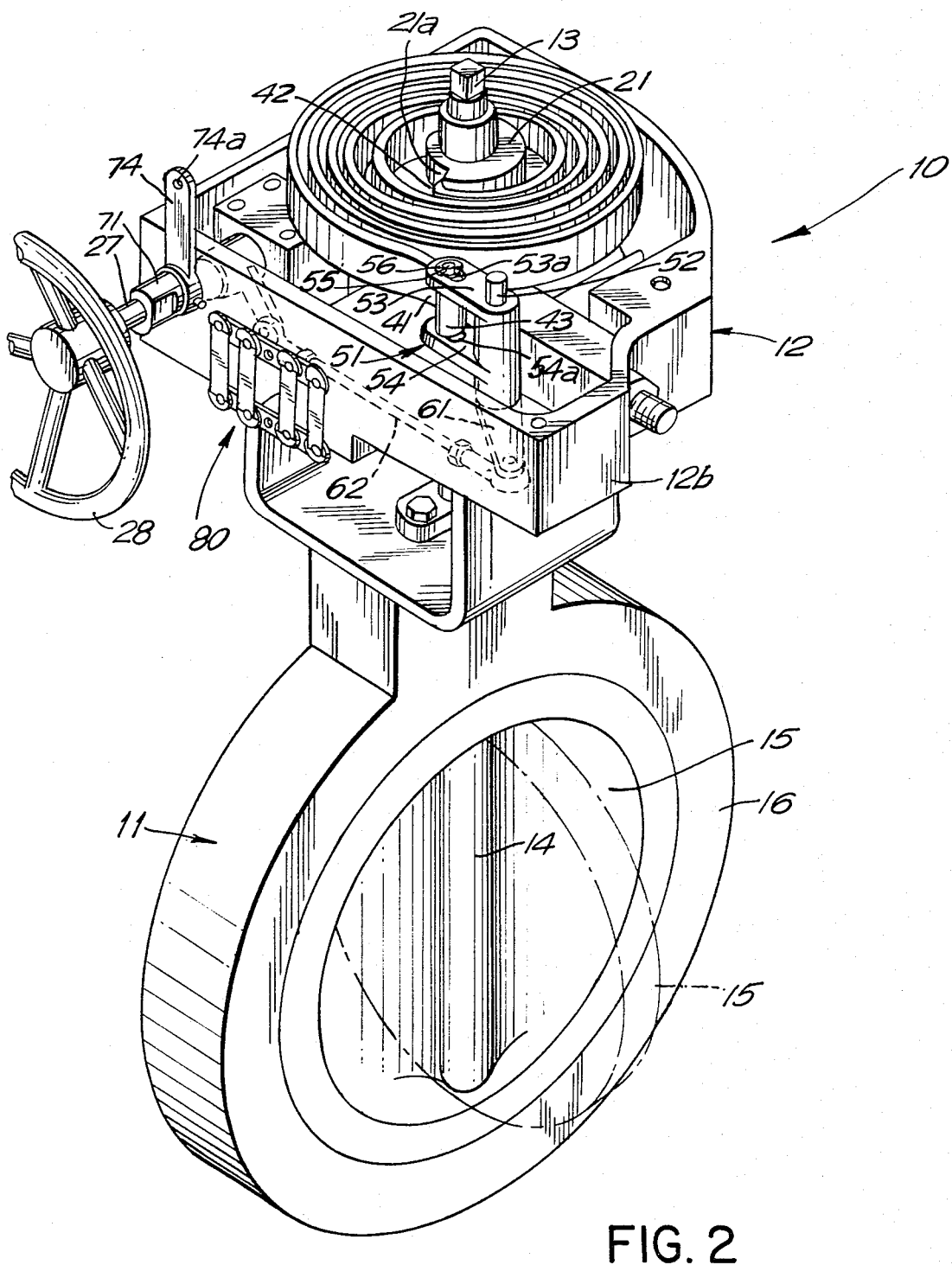
FIG. 2 is a perspective view, phantom in part, of the subject actuator mounted on a wafer trunnion type of butterfly valve.

In FIG. 2, a preferred embodiment of a valve actuator 10 according to the invention is shown mounted on a wafer trunnion butterfly valve 11 of conventional design. It will be understood that the subject actuator may be used with other rotary valves such as plug and ball valves, as well as other similar apparatus, and is not limited to butterfly valves. Nor is the subject actuator limited to quarter-turn apparatus that operate between 0° and 90°.

Figure 5:
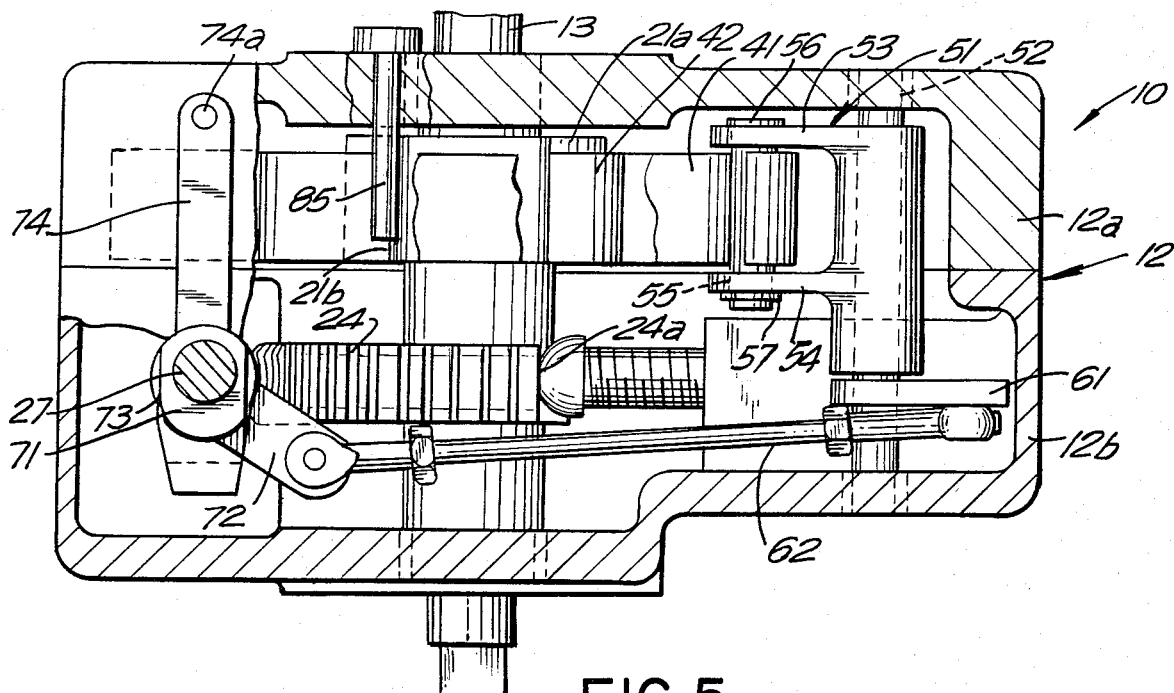
FIG. 5 is a cross-sectional view of the subject actuator taken along 5—5 of FIG. 3.

As illustrated, actuator 10 comprises a support structure such as a housing 12 having upper (See FIGS. 5 and 6) and lower portions 12a and 12b, respectively. A rotatable output shaft 13 extends vertically through the actuator housing and is coupled by conventional means (not shown) to a stem 14 of a valve disc 15 rotatably mounted in body 16 of the valve. Rotation of shaft 13 effects rotation of valve stem 14 and the opening and closing of the valve.

Referring now to FIGS. 1-4, actuator 10 further comprises biasing means coupled to output shaft 13, for biasing shaft 13 in a first position. As illustrated, the biasing means may be a spiral torsion spring 41 disposed around shaft 13, the spring having an inner end portion 42 and an outer end portion 43. Spring 41 is coupled to shaft 13 by means of a spring hub 21 that is fixedly connected to shaft 13. Preferably, hub 21 has a pair of shoulder portions 21a and 21b (See FIGS. 3 and 4), one of which, namely, shoulder 21a, engages spring inner end portion 42. Thus, rotation of shaft 13 against the bias of spring 41, i.e., in a clockwise direction in FIGS. 3 and 4, effects the tightening of spring 41.

Still referring to FIGS. 1-4, the subject actuator includes means for rotating shaft 13 and for fixing the shaft in a continuum of positions. As illustrated, the actuator includes a gear member 24 that is fixedly connected to shaft 13 in spaced relationship with hub 21. Gear 24 preferably includes at least one shoulder portion 24a for engaging, as will be described below, a stop member 29 mounted in the actuator housing. As illustrated, stop 29 may comprise a bolt member whose position within the housing may be adjusted as desired.

A gear drive member, e.g., a worm 26 is disposed adjacent gear 24 for selective engagement and disengagement therewith. As shown, worm 26 is fixed to a gear shaft that is operable by a handwheel 28. With worm 26 in engagement with gear 24, operation of handwheel 28 can effect the rotation of shaft 13 from a first position, e.g., that shown in FIG. 3 with gear shoulder 24a resting against stop 29, to a second position, e.g., that shown in FIG. 4, as well as any of a continuum of positions between those first and second positions.

Preferably, gear shaft 27 is rotatably disposed within a crankshaft member 71 that is mounted in the actuator housing through housing aperture 30, pillow bearings 31 and 32 and roller thrust bearing 33. As shown, crankshaft 71 comprises a pair of spaced apart body portions 71a and 71b, each being disposed on either side of worm 26, and a generally U-shaped connector member 71c for connecting said body portions. It is also preferable that crankshaft 71 include an extension member 72 whose function will be described below, and a flat portion 73 which is adapted to be received in a wrench for effecting manual rotation of the crankshaft.

In accordance with the preferred embodiment of the invention, gear shaft 27 and crankshaft 71 are eccentric with one another so that rotation of crankshaft 71 in one direction moves worm 26 towards gear 24 for engagement therewith, and rotation of crankshaft 71 in the opposite direction moves worm 26 away from gear 24 for disengagement therefrom. The eccentricity between gear shaft 27 and crankshaft 71 may best be seen by reference to FIG. 3-6.

Actuator 10 further includes spring engagement means mounted within the actuator housing for engaging spring outer end portion 43. As shown, the spring engagement means preferably comprises a cocking lever 51 that is pivotally mounted to the actuator housing by a cocking lever pin 52. Cocking lever 51 includes a pair of spaced apart flange members 53 and 54 each having an aperture 53a and 54a, respectively. A declutching pin 55 for engaging spring outer end portion 43 is rotatably disposed through apertures 53a and 54a and held in place by means of retaining rings 56 and 57 (See FIG. 5).

A pivot lever 61 is fixedly coupled to cocking lever 51, and a linkage member 62 is pivotally connected at one end to cocking lever 51 by pivot pin 64. The other end of linkage member 62 is pivotally connected to extension portion 72 of crankshaft 71.

Still referring to FIGS. 1-4, an activator arm 74 is fixedly connected at one end to crankshaft 71. The other end of activator arm 74 is selectively connectable, upon rotation of crankshaft 71, to a receiver assembly 80 that is mounted on the actuator housing adjacent to crankshaft 71 for activating and deactivating the actuator. In the embodiment of the invention illustrated in FIGS. 1-4, receiver assembly 80 comprises a pair of spaced apart bar members 81 and 82 that are connected to one another by a plurality of fusible link members 83. Bar member 82 is fixed to the actuator housing. Bar member 81 is spaced apart from the housing and includes an aperture 81a that is adapted to coincide with an aperture 74a in activator arm 74. A connecting pin 91 is receivable in apertures 81a and 74a for connecting activator arm to bar 81. Fusible link members 83 are designed to melt upon the occurrence of a fire or a high temperature condition that creates an ambient temperature above a predetermined level, e.g., 125° F., 160° F., 286° F., 360° F., etc.. The melting of fusible links 83 effects the disconnecting of bar 81 from bar 82.

Figure 3:
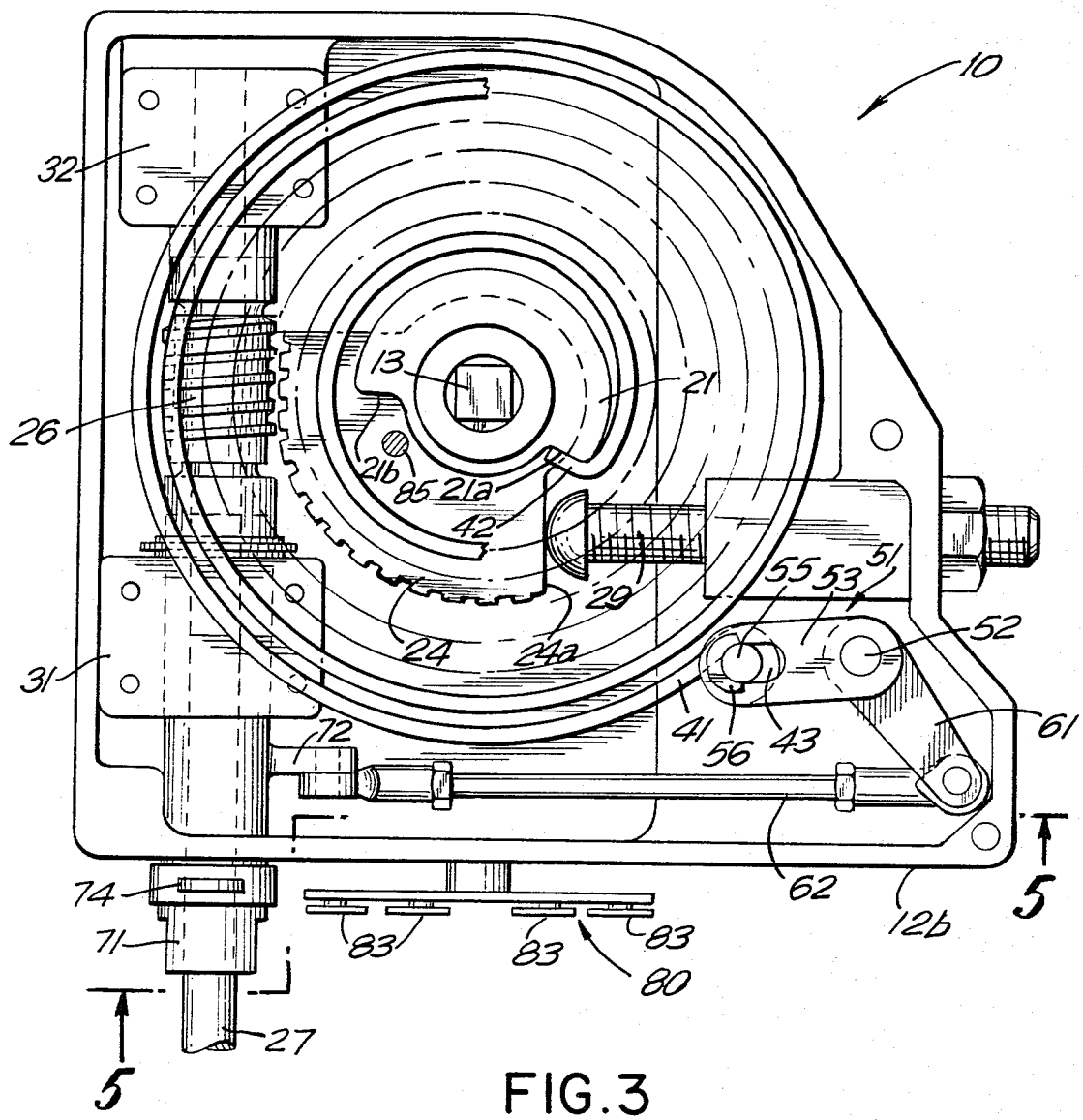
FIG. 3 is a plan view, phantom in part, of the subject actuator in the deactivated state.

In the preferred embodiment of the invention, torsion spring 41 is provided with a pre-load stored energy level. Referring to FIG. 3, this may be accomplished by adjusting the position of stop bolt 29, e.g. moving bolt 29 to the right in FIG. 3, so that shaft 13 may be freely rotated in a clockwise direction. Such clockwise rotation of shaft 13 effects the tightening of spring 41 by the action of hub shoulder 21a on spring inner end portion 42. Preferably, shaft 13 is rotated such that gear shoulder 24a is brought to a position slightly less than 360° from its position shown in FIG. 3. A stop bolt member 85 may then be inserted through housing upper portion 12a (See FIG. 3-5) such that stop bolt 85 engages hub shoulder portion 21b so as to prevent the loosening of spring 41. Stop bolt 29 is then moved to the left until it engages gear shoulder 24a and pushes it back to the position shown in FIG. 3. This readjustment of stop bolt 29 disengages stop bolt 85 from hub shoulder 21b.

As a result of the above spring tightening process, the pre-load stored energy in spring 41 acts to force gear shoulder 24a against stop bolt 29 when the actuator is in the state illustrated in FIG. 3.

Turning now to the operation of the subject actuator FIG. 3 illustrates the actuator in the deactivated state. As shown, activator arm 74 is not connected to receiver assembly 80 and worm 26 is spaced apart from, i.e., disengaged from gear 24. In addition, gear shoulder portion 24a engages stop bolt 29 and the pivotally connected ends of pivot lever 61 and linkage member 62 are disposed as far as they can be from crankshaft 71, i.e., in the lower right hand corner of the actuator housing illustrated in FIG. 3. It will be noted that the actuator is biased to the deactivated state by reason of the force exerted by torsion spring 41 through cocking lever 51, pivot lever 61 and linkage member 62. In addition, because of the pre-load stored energy in spring 41, gear shoulder 24a is forced against stop bolt 29. For the sake of simplicity it will be assumed that the deactivated actuator shown in FIG. 3 is mounted on a valve which has its valve disc in the closed position. It will also be assumed that the valve is to be operated in the fail-close mode.

Figure 4:
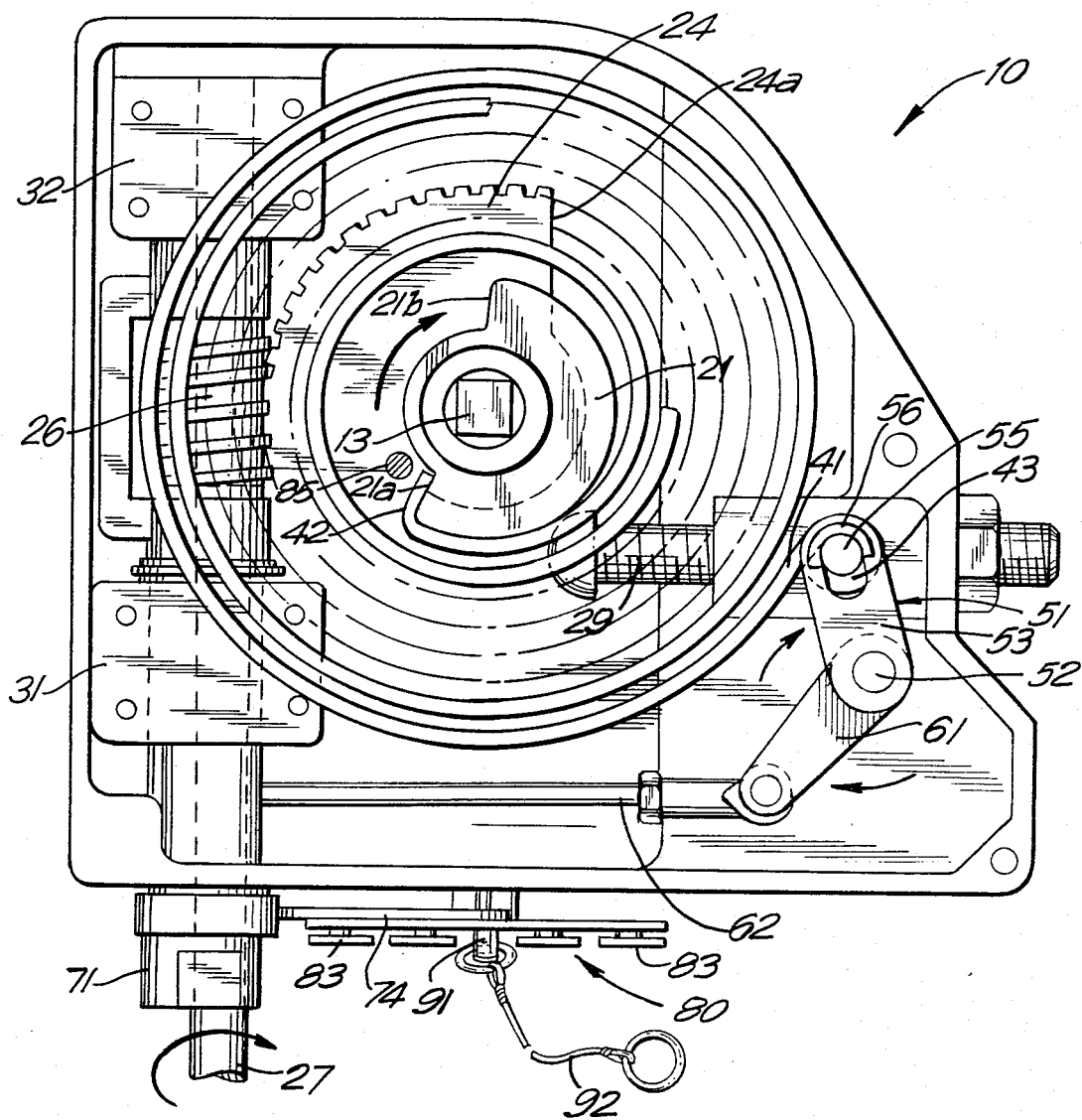
FIG. 4 is a plan view, phantom in part, of the subject actuator in the fully activated state.

FIG. 4 illustrates the subject actuator in the fully activated state. As illustrated, crankshaft 71 has been rotated in the direction of the arrow shown adjacent thereto and activator arm 74 has been fixed to receiver assembly 80 by the placing of pin 91 through apertures 81a and 74a of assembly bar 81 and activator arm 74, respectively. Because of the eccentricity between gear shaft 27 and crankshaft 71, the indicated rotation of crankshaft 71 moves worm 26 towards gear 24 and into engagement therewith. In addition, rotation of crankshaft 71, as indicated, causes the movement of linkage member 62 and pivot lever 61 towards the crankshaft, and the pivoting of pivot lever 61 and cocking lever 51 in the direction indicated by the arrows shown adjacent to said levers. Such pivoting of cocking lever 51 effects the tightening of torsion spring 41 by the action of the cocking lever on spring outer end 43. Spring inner end 42, which engages hub shoulder 21a, is held stationary because actuator shaft 13, to which hub 21 is fixed, is inhibited from rotating as a result of the engagement of worm 26 with gear 24 which is also fixed to shaft 13.

As further illustrated in FIG. 4, with worm 26 and gear 24 in engagement, rotation of gear shaft 27 in the indicated direction by operation of hand wheel 28 effects the rotation of gear 24 to the position shown in FIG. 4, and attendant therewith the opening of the valve. Thus, with the actuator in the activated state, the valve may be manually operated so as to be fully open, fully closed, or in any intermediate position. Moreover, rotation of gear shaft 27 in the direction indicated by the arrow shown adjacent thereto in FIG. 4 effects the further tightening of torsion spring 41 as hub 21 is also rotated while spring outer end 43 is held stationary by cocking lever 51.

Referring now to FIGS. 3 and 4, upon the occurrence of a fire or a high temperature condition that melts fusible links 83 of assembly 80 so as to disconnect bars 81 and 82, the force stored in spring 41 causes spring outer end 43 to act on cocking lever 51 and pivot it back to the position shown in FIG. 3. Such pivoting, in turn, effects the reverse rotation of crankshaft 71, through pivot lever 61 and linkage member 62, crankshaft 71 now being free to rotate to the position shown in FIG. 3 because the crankshaft is no longer restrained from movement by the connection between activator arm 74 and assembly 80. Rotation of crankshaft 71 to the position in FIG. 3 also effects the disengagement of worm 26 from gear 24. As a result, the stored energy in spring 41 causes spring inner end 42 to act on hub shoulder 21a so as to rotate hub 21 and shaft 13 in a counterclockwise direction as shown in FIG. 4, and attendant therewith valve stem 14 and valve disc 15 until gear shoulder 24a engages stop 29 as shown in FIG. 3 and the valve disc is closed. In order to operate the valve in the fail-open mode, the actuator may be mounted reverse from that shown in the Figures.

In the preferred embodiment of the invention, the actuator includes shock absorbing means for absorbing the energy associated with the unrestrained rotation of the actuator shaft and coupled masses (valve disc, valve stem, etc.) during actuator deactivation. As shown in the figures such shock absorbing means may comprise a cushioning tip member 29a that is attached to the end of stop member 29 for cushioning the impact between gear shoulder 24a and stop 29 during actuator deactivation. Other shock absorbing means such as a dashpot arrangement or other damping means may also be used to control the rotation of actuator shaft 13 during deactivation or to cushion the impact of gear shoulder 24a with stop 29.

In addition to the fusible link assembly 80 described above for deactivating the subject actuator and automatically closing or opening the valve on which the actuator is mounted other means may be used. For example, as shown in FIG. 4, a lanyard 92 may be attached to connecting pin 91. To deactivate the actuator and automatically close or open the valve, an operator needs only to pull lanyard 92 so as to disconnect activator arm 74 from assembly 80 and permit crankshaft 71 to rotate. Where simply a manual release is desired, the actuator housing, instead of having bars 81 and 82, may have an aperature which can cooperate with actuator arm aperture 74a to receive a connecting pin for fixing the activator arm to the housing.

Figure 6:
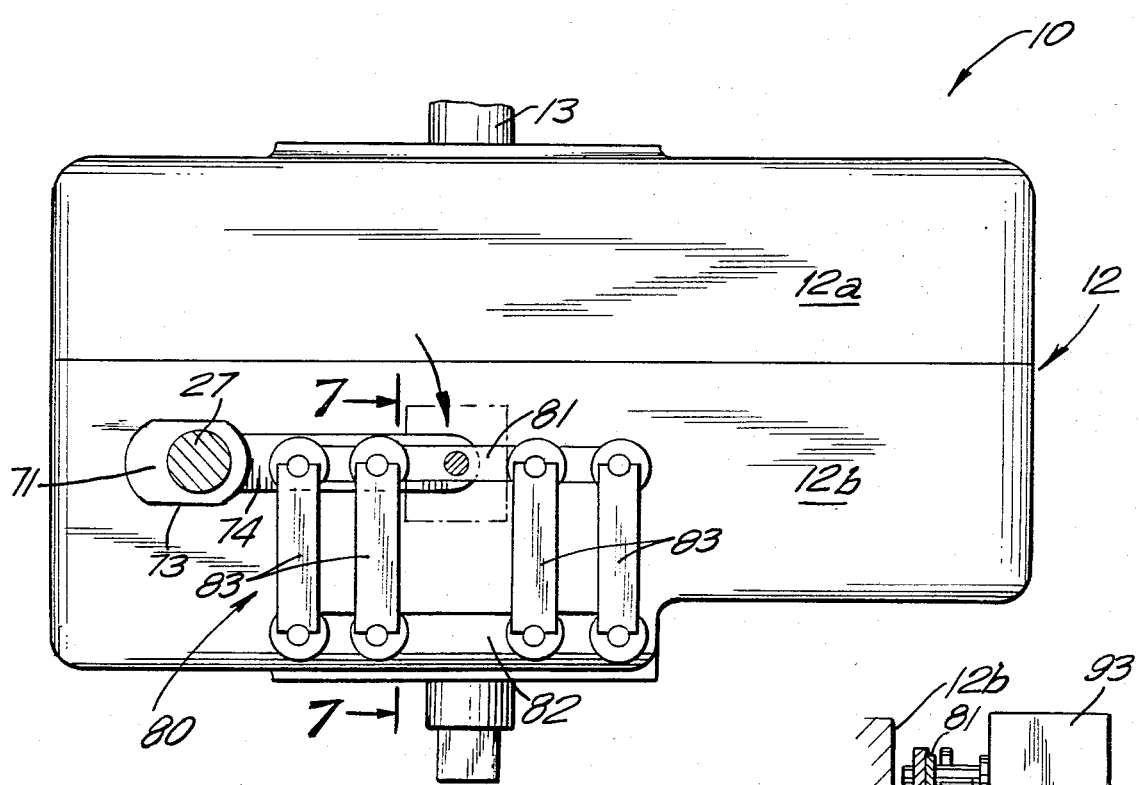
FIG. 6 is an elevational view of an alternate embodiment the subject actuator.
Figure 7:
FIG. 7 is a cross-sectional view of an alternate embodiment the subject actuator taken along line 7—7 of FIG. 6.

Referring to FIGS. 6 and 7, other means may be used for deactivating the subject actuator. For example a deactivator 93 may be mounted on bar 81. As shown, deactivator 93 includes a pin member 94 adapted to be received in apertures 74a and 81a of activator arm 74 and bar 81, respectively. Deactivator 93 also includes means for selectively reciprocating pin 94 such that said pin is positioned to either fix activator arm 74 to bar 81, i.e., activate the actuator, or disconnect activator arm 74 from bar 81, i.e., deactivate the actuator and effect the automatic closing or opening of the valve. Deactivator 93 may comprise a solenoid that moves pin 94 as desired upon the loss or application of an electrical signal. Deactivator 93 may also comprise pneumatic means that acts on pin 94 upon the loss or application of gas pressure. Deactivator 93 may further comprise hydraulic means that acts on pin 94 upon the loss or application of hydraulic pressure. It will be understood that above described deactivator will require certain connections to equipment, e.g., electrical wiring, hoses, etc. not shown in the figures, but that said connections and additional equipment are within the knowledge of those in the industry.

It will also be noted that an automatic deactivator as described above may be used with or without a fusible link assembly. Moreover, as described above with regard to the use of a simple manual release, an automatic deactivator may be mounted adjacent to the actuator housing for cooperating with an aperture in the housing and the activator arm aperture for fixing the activator arm to the housing. Finally, in addition to the use of a connecting pin that cooperates with an aperture in the activator arm and or aperture in a receiver associated with the actuator housing, other means for temporarily fixing the activator arm so as to activate the subject actuator may be employed.

While the preferred embodiments of the subject invention have been described and illustrated, it would be obvious that various changes and modifications can be made therein without departing from the spirit of the invention which should be limited only by the scope of the appended claims.

What is claimed is:
1. An actuator for a rotary valve having a rotatable closure member comprising:
a housing mountable on the valve adjacent to the valve closure member;
an output shaft member rotatably mounted in the housing and adapted to be coupled to the valve closure member such that rotation of said output shaft member effects the rotation of said closure member;
unitary biasing means having first and second end portions, the first end portion being coupled to said output shaft member for biasing said output shaft member to a first position;
means for rotating said output shaft member against the bias of said unitary biasing means from said first position to a second position, said rotating means being adapted to fix said output shaft member in said second position;
clutch means associated with said rotating means for selectively coupling said rotating means with said output shaft member, said clutch means having a first position which effects the uncoupling of said rotating means from said output shaft member and a second position which effects the coupling of said rotating means with said output shaft member said clutch means being coupled to said second end portion of said biasing means for biasing said clutch means to its first position;
clutch fixing means for selectively fixing said clutch means in its second position, against the bias of said unitary biasing means; and
release means associated with said clutch fixing means for selectively releasing said clutch fixing means such that said unitary biasing means can return said clutch means to its first position, thus uncoupling said rotating means from said output shaft member and also permitting said unitary biasing means to return said output shaft member to its first position.

2. An actuator as in claim 1 wherein said rotating means comprises gear means fixedly connected to said output shaft member; gear drive means disposed adjacent to said gear means, and a gear shaft fixedly connected to said gear drive means for rotating said gear drive means and effecting the rotation of said gear means and output shaft member when said gear drive means is coupled to said gear means.

3. An actuator as in claim 2 wherein said clutch means comprises a crankshaft member rotatably mounted within the actuator housing, said gear shaft being rotatably disposed within said crankshaft member, said crankshaft member having a pair of spaced apart body portions and means for connecting said body portions to one another, said gear drive means being disposed in the space between said crankshaft body portions, said gear shaft being eccentric with said crankshaft member such that when said crankshaft member is in a first position said gear drive means is uncoupled from said gear means, and when said crankshaft member is rotated to a second position said gear drive means is coupled to said gear means.

4. An actuator as recited in claim 3 wherein said clutch fixing means comprises an activator arm fixedly connected at one end to said crankshaft member, the other end of the activator arm being adapted to cooperate with receiver means associated with the housing and connector means for connecting said other end of the activator arm with said receiver means for temporarily restraining said crankshaft member from movement when said crankshaft member is in its second position, and wherein said release means comprises means for acting on said activator arm, receiver means and connector means so as to free said activator arm from restraint of movement and permit the crankshaft member to rotate to its first position.

5. An actuator as recited in claim 4 wherein said receiver means comprises a bar fixedly connected to the housing, said bar member having an aperture for cooperating with an aperture in said activator arm and a connecting pin to be received in the apertures in said activator arm and bar member and wherein said release means comprises means for selectively withdrawing said connector pin from the apertures in said activator arm and said bar member so as to disconnect said activator arm from said bar member.

6. An actuator as recited in claim 3 wherein said unitary biasing means comprises spiral spring means disposed around said output shaft member, said spiral spring means having an inner end portion and an outer end portion, said first and second end portions of said unitary biasing means comprising the inner and outer end portions, respectively, of said spiral spring means, and wherein said actuator further comprises first spring engagement means associated with said output shaft member for engaging the inner end portion of said spring means and effecting the tightening of said spiral spring means as the output shaft member is rotated towards its second position; second spring engagement means mounted within the housing for engaging the outer end portion of said spiral spring means; and linkage means coupled to said second spring engagement means and said crankshaft member such that when said crankshaft member is rotated towards its second position said second spring engagement means acts on the said outer end portion of said spiral spring means so as to tighten said spiral spring means.

7. An actuator as recited in claim 6 wherein said second spring engagement means comprises a first lever member pivotally connected to the housing, said first lever member including a pair of spaced apart flange members, each of said flange members having an aperture, and a pin member rotatably mounted within said flange apertures for engaging the outer end portion of said spiral spring means such that when said first lever is in a first position said spiral spring means has a first stored energy level, and when said first lever is pivoted to a second position said spiral spring means has a second stored energy level that is greater than said first stored energy level, and wherein said linkage means comprises a second lever member fixedly coupled to said first lever member and a linkage arm pivotally connected at one end to said second lever member and at the other end to said crankshaft member such that when said crankshaft member is in its first position said first lever member is in its first position and when said crankshaft member is in its second position said first lever member is in its second position.

8. An actuator as recited in claim 4 wherein said receiver means comprises first and second spaced apart bar members, said first bar member being fixedly connected to the housing, the second bar member being coupled to said first bar by the activator release means said second bar being adapted to be connected by said connector means to said activator arm, the release means of said actuator comprising a fusible link member connected between said first and second bar members, said fusible link member having a predetermined melting point such that when the ambient temperature around said actuator meets or exceeds such melting point, said fusible link member will melt, thus uncoupling said first and second bar members and freeing said activator arm and second bar member from the housing and permitting the crankshaft to rotate to its first position.

9. An actuator as recited in claim 4 disposed wherein said release means comprises a solenoid member disposed adjacent to said receiver means for acting on said connector means so as to selectively connect or disconnect said activator arm from said receiver means upon the loss or application of an electrical signal.

10. An actuator as recited in claim 4 wherein said release means comprises pneumatic means disposed adjacent to said receiver means for acting on said connector means so as to pneumatically connect or disconnect said activator arm from said receiver means upon the loss or application of pneumatic pressure.

11. An actuator as recited in claim 4 wherein said release means comprises hydraulic means disposed adjacent to said receiver means for acting on said connector means so as to connect or disconnect said activator arm from said receiver means upon the loss or application of hydraulic pressure.

12. An actuator as recited in claim 1 which further comprises a stop member, and a stop engagement member associated with said output shaft member for engaging said stop member when said output shaft member is in its respective first position.

13. An actuator as recited in claim 12 wherein said unitary biasing means has a predetermined stored energy level when said output shaft member is in its first position so as to force said stop engagement member against said stop member when said output shaft member is in its first position.

14. An actuator for a rotary valve having a rotatable closure member comprising:
a housing mountable on the valve adjacent to the valve closure member;
an output shaft member rotatably mounted in the housing and adapted to be coupled to the valve closure member such that rotation of said output shaft member effects the rotation of said closure member;
unitary means having first and second end portions, the first end portion being coupled to said output shaft member for biased said output shaft member to a first position;
gear means fixedly connected to said output shaft member;
a gear shaft rotatably mounted within the housing;
gear drive means fixedly connected to said gear shaft adjacent to said gear means;
a crankshaft member rotatably mounted within the housing, said gear shaft being rotatably disposed within said crankshaft member said crankshaft member having a pair of spaced apart body portions and means for connecting said body portions to one another, said gear drive means being disposed in the space between said crankshaft body portions, said gear shaft being eccentric with said crankshaft member such that when said crankshaft member is in a first position said gear drive means is disengaged from said gear means, and when said crankshaft member is rotated to a second position said gear drive means is brought into engagement with said gear means such that rotation of said gear shaft when said crankshaft member is in its second position effects the rotation of said output shaft member and the selective fixing of said output shaft member in its second position, said crankshaft member being coupled to the second end portion of said unitary biasing means for biasing said crankshaft member to its first position;
engagement fixing means for selectively fixing said crankshaft member in its second position; and
release means associated with said engagement fixing means for releasing said engagement fixing means such that said unitary biasing means can return the crankshaft member to its first position, thus disengaging the gear drive means from the gear means and also permitting said unitary biasing means to return the output shaft member to its first position.

15. An actuator as recited in claim 14 wherein said unitary biasing means comprises spiral spring means disposed around said output shaft member, said spiral spring means having an inner end portion and an outer end portion, said first and second end portions of said unitary biasing means comprising the inner and outer end portions, respectively, of said spiral spring means, and wherein said actuator further comprises first spring engagement means associated with said output shaft member for engaging the inner end portion of said spiral means and effecting the tightening of said spiral spring means as the output shaft member is rotated toward its second position; second spring engagement means mounted in the housing for engaging the outer end portion of said spiral spring means; and linkage means coupled to said second spring engagement means and said crankshaft member such that when said crankshaft member is rotated towards its second position said second spring engagement means acts on the outer end portion of said spiral spring means so as to tighten said spiral spring means.

16. An actuator as recited in claim 15 wherein said second spring engagement means comprises a first lever member pivotally connected to the housing, said first lever member including a pair of spaced apart flange members, each of said flange members having an aperture, and a pin member rotatably mounted within said flange apertures for engaging the outer end portion of said spiral spring means such that when said first lever is in a first position said spiral spring means has a first stored energy level and when said first lever is pivoted to a second position said spiral spring means has a second stored energy level that is greater than said first stored energy level, and wherein said linkage means comprises a second lever member fixedly connected to said first lever member, and a linkage arm pivotally connected at one end to said second lever member and at the other end to said crankshaft member such that when said crankshaft member is in its first position said first lever is in its first position and when said crankshaft member is in its second position said first lever member is in its second position.

17. An actuator as recited in claim 14 wherein said engagement fixing means comprises an activator arm fixedly connected at one end to the crankshaft member, the other end of said activator arm being adapted to cooperate with receiver means associated with the housing and connector means for connecting said other end of the activator arm with said receiver means for temporarily restraining said crankshaft member from movement when said crankshaft member is in its second position, and wherein said release means comprises means for acting on said activator arm, receiver means and connector means so as to free said activator arm from restraint of movement and permit the crankshaft member to rotate to its first position.

18. An actuator as recited in claim 14 which further comprises a stop member and a stop engagement member associated with said output shaft member for engaging said stop member when said output shaft member is in its respective first position.

19. An actuator as recited in claim 18 wherein said unitary biasing means has a predetermined stored energy level when said output shaft member is in its respective first position so as to force said stop engagement member against said stop member when said output shaft member is in its first position.

20. An actuator as recited in claim 17 wherein said receiver means comprises first and second spaced apart bar members, said first bar member being fixedly connected to the housing, the second bar member being coupled to said first bar by the activator release means said second bar being adapted to be connected by said connector means to said activator arm, the release means of said actuator comprising a fusible link member connected between said first and second bar members, said fusible link member having a predetermined melting point such that when the ambient temperature around said actuator meets or exceeds such melting point, said fusible link member will melt, thus uncoupling said first and second bar members and freeing said activator arm and second bar member from the housing and permitting the crankshaft to rotate to its first position.

21. An actuator for a rotary valve having a rotatable closure member comprising:

a housing mountable on the valve adjacent to the valve closure member;

an output shaft member rotatably mounted in the housing and adapted to be coupled to the valve closure member such that rotation of said output shaft member effects the rotation of said closure member;

gear means fixedly connected to said output shaft member;

a gear shaft rotatably mounted within the housing;

gear drive means fixedly connected to said gear shaft adjacent to said gear means;

a crankshaft member rotatably mounted within the housing, said gear shaft being rotatably disposed within said crankshaft member, said crankshaft member having a pair of spaced apart body portions and means for fixedly connecting said body portions to one another, said gear drive means being disposed in the space between said crankshaft body portions, said gear shaft being eccentric with said crankshaft member such that when said crankshaft member is in a first position said gear drive means is disengaged from said gear means, and when said crankshaft member is rotated to a second position said gear drive means is brought into engagement with said gear means such that rotation of said gear shaft when said crankshaft member is in its second position effects the rotation of said output shaft member and the selective fixing of said output shaft member in its second position and a continuum of intermediate positions between the first and second positions of said output shaft member;

spiral spring means disposed around said output shaft member, said spiral spring means having an inner end portion and an outer end portion;

first spring engagement means associated with said output shaft member for engaging the inner end portion of said spiral spring means and effecting the tightening of said spiral spring means as the output shaft member is rotated toward its second position;

second spring engagement means mounted in the housing for engaging the outer end portion of said spiral spring means;

linkage means coupled to said second spring engagement means and said crankshaft member such that when said crankshaft member is rotated towards its second position said second spring engagement means acts on the outer end portion of said spiral spring means so as to tighten said spiral spring means;

engagement fixing means for selectively fixing said crankshaft member in its second position; and release means associated with said engagement fixing means for releasing said engagement fixing means such that said spiral spring means can return the crankshaft member to its first position, thus disengaging the gear drive means from the gear means and permitting the spiral spring means to return the output shaft member to its first position.

22. An actuator as recited in claim 21 wherein said second spring engagement means comprises a first lever member pivotally connected to the housing, said first lever member including a pair of spaced apart flange members, each of said flange members having an aperture, and a pin member rotatably mounted within said flange apertures for engaging the outer end portion of said spiral spring means such that when said first lever is in a first position said spiral spring means has a first stored energy level and when said first lever is pivoted to a second position said spiral spring means has a second stored energy level that is greater than said first stored energy level, and wherein said linkage means comprises a second lever member fixedly connected to said first lever member, and a linkage arm pivotally connected at one end to said second lever member and at the other end to said crankshaft member such that when said crankshaft member is in its first position said first lever is in its first position and when said crankshaft member is in its second position said first lever member is in its second position.

23. An actuator as recited in claim 22 wherein said engagement fixing means comprises an activator arm fixedly connected at one end to the crankshaft member, the other end of said activator arm being adapted to cooperate with receiver means associated with the housing and connector means for connecting said other end of the activator arm with said receiver means for temporarily restraining said crankshaft member from movement when said crankshaft member is in its second position, and wherein said release means comprises means for acting on said actuator arm, receiver means and connector means so as to free said activator arm from restraint of movement and permit the crankshaft member to rotate to its first position.

24. An actuator as recited in claim 23 wherein said receiver means comprises first and second spaced apart bar members, said first bar member being fixedly connected to the housing, the second bar member being coupled to said first bar by the activator release means said second bar being adapted to be connected by said connector means to said activator arm, the release means of said actuator comprising a fusible link member connected between said first and second bar members, said fusible link member having a predetermined melting point such that when the ambient temperature around said actuator meets or exceeds such melting point, said fusible link member will melt, thus uncoupling said first and second bar members and freeing said activator arm and second bar member from the housing and permitting the crankshaft to rotate to its first position.

25. An actuator as recited in claim 21 which further comprises a stop member and a stop engagement member associated with said output shaft member for engaging said stop member when said output shaft member is in its respective first position.

26. An actuator as recited in claim 25 wherein said first biasing means has a predetermined stored energy level when said output shaft member is in its respective first position so as to force said stop engagement member against said stop member when said output shaft member is in its first position.

* * * * *